United States Patent [19]

DiMartino

[11] Patent Number: 4,704,267
[45] Date of Patent: Nov. 3, 1987

[54] PRODUCTION OF HYDROGEN FROM AMMONIA

[75] Inventor: Stephen P. DiMartino, Topton, Pa.

[73] Assignee: Air Products and Chemicals, Inc., Allentown, Pa.

[21] Appl. No.: 866,036

[22] Filed: May 21, 1986

[51] Int. Cl.$^4$ ................................................ C01B 3/56
[52] U.S. Cl. .................................. 423/648 R; 423/351
[58] Field of Search ............................. 423/648 R, 351

[56] References Cited

U.S. PATENT DOCUMENTS

| | | | |
|---|---|---|---|
| 3,102,003 | 8/1963 | Kummer | 423/648 R |
| 3,254,956 | 6/1966 | Hunter | 423/648 R |
| 3,505,207 | 4/1970 | Breitbach et al. | 423/648 R |
| 4,157,270 | 6/1979 | Martignoni et al. | 423/648 R |
| 4,360,505 | 11/1982 | Sheridan et al. | 423/248 |
| 4,544,527 | 10/1985 | Meyerhoff | 423/648 R |

FOREIGN PATENT DOCUMENTS 83306428.0 10/1983 European Pat. Off. .

OTHER PUBLICATIONS

G. Strickland, "Hydrogen Derived from Ammonia: Small-Scale Costs", Int./Hydrogen Energy, vol. 9, No. 9, pp. 759–766 (1984).

Primary Examiner—John Doll
Assistant Examiner—Wayne A. Langel
Attorney, Agent, or Firm—Mark L. Rodgers; William F. Marsh; James C. Simmons

[57] ABSTRACT

High purity hydrogen is produced at high recovery from liquid anhydrous ammonia. Ammonia is vaporized and subsequently dissociated into is constituents. The resulting dissociated gas stream is passed to an adiabatic metal hydride purification unit to absorb hydrogen present in the stream. The adsorbed hydrogen is then recovered as high purity product.

6 Claims, 1 Drawing Figure

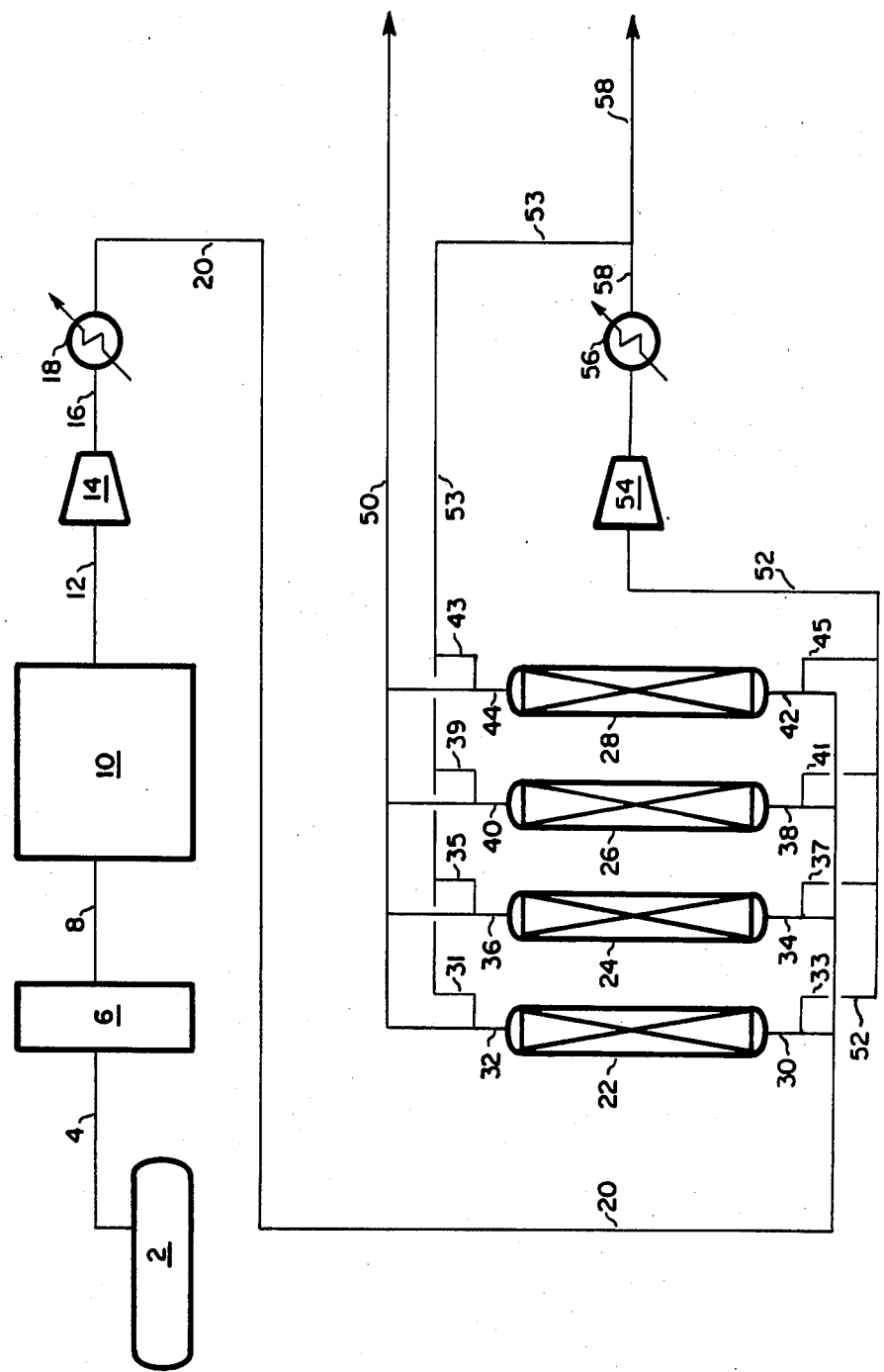

PRODUCTION OF HYDROGEN FROM AMMONIA

TECHNICAL FIELD OF THE INVENTION

The present invention relates to the production and recovery of high purity hydrogen from ammonia.

BACKGROUND OF THE INVENTION

In the past, most small-scale; i.e. less than 250,000 SCFD, hydrogen users relied on a liquid hydrogen storage supply or delivery of high pressure gaseous hydrogen via tube trailers to supply hydrogen at the desired site. On-site liquid hydrogen storage tanks have proved to be very inefficient, many resulting in a boil-off of about 0.2% per day. This results in an inflated unit cost of hydrogen, especially when the hydrogen is stored on-site over a relatively long period of time. Delivery of the liquid hydrogen supply by tube trailer also results in an increased hydrogen cost due to liquefaction, travel and delivery costs, especially if the desired point of use is located at a considerable distance from the hydrogen production plant.

Small-scale users have employed ammonia dissociation methods to produce hydrogen from an on-site liquid ammonia storage tank. While this method overcomes the problem of liquid hydrogen boil-off, the purity of the hydrogen produced is generally too low and must subsequently be further treated in a PSA (pressure swing adsorption) unit. The use of an ammonia dissociation unit combined with a PSA unit typically results in about a 25% loss of the total hydrogen. An alternative method was also developed using an on-site supply of methanol which could be dissociated as the hydrogen is needed. As with the ammonia dissociation method, the hydrogen must undergo further purification steps, such as treatment in a PSA unit, which results in a large product loss.

An article by G. Strickland entitled "Hydrogen Derived from Ammonia: Small-Scale Costs", Int. J. Hydrogen Energy, Vol. 9, No. 9, pp 759–766 (1984) states that hydrogen derived from anhydrous liquid $NH_3$, via a dissociator and $H_2$ purifier, offers an alternative to conventional methods of obtaining pure $H_2$ for small-scale use. The specific process outlined in the article employees a polybed pressure swing adsorption (PSA) system for the $H_2$ purification step. It is stated that when using this purification step in conjunction with ammonia dissociation, about 75% of the hydrogen could be recovered with a fuel credit obtained for the remainder.

European patent application No. 83306428.0 discloses a method and apparatus for the production and delivery of hydrogen, especially adapted for on-site production for hydrogen users requiring on the order of 28 to 2800 $m^3$ of hydrogen per day. According to the disclosure, hydrogen is produced by first dissociating ammonia in a typical dissociation reactor, and subsequently passing the ammonia feed stream to a bed of hydridable material which exothermically and selectively adsorbs hydrogen from the feed stream and endothermically desorbs hydrogen on demand. The $H_2$ purification hydride system comprises at least one flow through reactor having inner and outer heat exchange shells and a bed of hydridable material located co-axially there between. Additionally, a means for circulating fluid through the heat exchanger shells whereby heat may be extracted therefrom during adsorption of hydrogen from the feed and whereby heat may be supplied thereto when hydrogen is desorbed from the hydride bed. It is stated that the heat transfer characteristics of the flow-through reactor of the disclosed invention are at the heart of its performance. The heat flow is interrelated to flow rate, pressure and recovery and those variables operate to establish the effective hydrogen adsorption pressure.

Sheridan, et al. U.S. Pat. No. 4,360,505 discloses an improved adiabatic process for separating hydrogen from mixed gas streams using hydridable materials as the adsorbing medium. The improvement involves utilizing a composite comprising a thermal ballast in admixture with the hydride material to adsorb the heat of the reaction and to aid in desorption. By virtue of the intimate contact of the ballast with the hydridable material, rapid cycle times plus good bed utilization are achieved.

BRIEF SUMMARY OF THE INVENTION

The present invention is a process for producing high purity hydrogen from liquid anhydrous ammonia. The process recovers at least 90% of the hydrogen present in the feed. A liquid anhydrous ammonia feed is vaporized to produce a gaseous ammonia stream which is subsequently passed to a dissociation unit where it is dissociated into hydrogen and nitrogen. The resulting dissociated gas stream is compressed to a pressure between 150 and 250 psia, and the compressed stream is passed to an adiabatic metal hydride purification unit to selectively adsorb the hydrogen present in the stream. The hydrogen is subsequently recovered from the metal hydride unit as a high purity; e.g. typically at least 99.9%, hydrogen product. Optionally, the process can be operated to recover a separate high purity nitrogen product as well as the hydrogen product.

The metal hydride purification unit operates adiabatically and therefore does not require the additional alternating heating and cooling steps of the prior art process.

BRIEF DESCRIPTION OF THE DRAWINGS

The single FIGURE is a flow diagram of one embodiment of the present invention.

DETAILED DESCRIPTION OF THE INVENTION

The present invention is a process for producing hydrogen at high purity; i.e., about 99.9% via ammonia dissociation and adiabatic hydride adsorption. The process produces high purity hydrogen at high recovery; i.e, at least 95%, based on feed. In an optional embodiment, the process can be designed to co-produce a high purity nitrogen stream.

Referring to the single FIGURE, liquid anhydrous ammonia stored in an on-site storage vessel 2, is passed as stream 4 to an ambient air vaporizer 6 where it is vaporized to gaseous ammonia. The gaseous ammonia exits the ambient air vaporizer 6 as stream 8 and is passed to an ammonia dissociation unit 10. In the dissociation unit 10, the ammonia dissociates to its constituents, 1½ moles hydrogen and ½ mole nitrogen per mole of ammonia. The dissociation unit 10, can be any type of conventional unit which is capable of dissociating ammonia. Typically, the dissociation unit comprises a plurality of catalyst-filled tubes in a fired heater.

The dissociated gas leaves the dissociation unit as stream 12 and is compressed to between 150 and 250 psia in compressor 14, to form a compressed gas stream 16. The compressed gas stream 16 is cooled in heat exchanger 18 to remove the heat of compression. The cooled and compressed gas stream 20 is passed to a metal hydride purification unit comprising a plurality of hydride-containing vessels 22, 24, 26, 28, which operate in a sequential manner. The cooled and compressed gas stream 20 containing both hydrogen and nitrogen, enters the first hydride-containing vessel 22 through line 30. The hydride bed adsorbs the hydrogen, allowing the nitrogen to pass through and exit the vessel through line 32, and is subsequently collected in line 50. After the hydride bed has picked up the maximum amount of hydrogen it can hold, a second bed 24 comes on line and the cooled and compressed gas stream 20 enters the second vessel 24 via line 34. As with the first bed, hydrogen is adsorbed and nitrogen passes through and exits vessel 24 via line 36 and is passed to line 50. In a similar manner during the adsorption steps of the other vessels 26, 28 via lines 40 and 44, respectively, on line, nitrogen passes through said vessels and is collected in line 50.

Typically, the metal hydride beds comprise hydridable alloys of at least two elements selected from the group consisting of iron, titanium, nickel, calcium, magnesium, maganese and rare earth metals. Any other suitable hydride material can be used which is selectively adsorbs hydrogen over nitrogen, and can be depressurized to release the adsorbed hydrogen.

After the hydride bed in the first vessel 22 reaches hydrogen capacity, it is rinsed with pure hydrogen from another bed, such as from the bed in vessel 24, to remove traces of nitrogen in the void volume of the vessel and the adsorbent. The hydrogen rinse stream is a portion of the hydrogen product which leaves vessel 24, and enters vessel 22 via lines 31 and 32 from hydrogen rinse line 53. After rinsing is complete; i.e. the rinse effluent has the same hydrogen concentration as the rinse influent, the hydride bed is depressurized, thereby releasing the adsorbed hydrogen. The hydrogen exists the vessel 22 via lines 30 and 33 from where it is passed to hydrogen product collection line 52. The hydride bed in vessel 22 is subsequently repressurized and is ready for the adsorption step, thereby beginning the cycle again.

Since there are four main process steps in the hydride purification unit; i.e. adsorption, rinse, depressurization, and repressurization, typical hydride purifications units consist of our hydride-containing vessels (22, 24, 26, 28), with each vessel concurrently undergoing a separate step. In practice, the hydride unit may contain any number of beds from one on up, with units having at least 4 being preferred fewer beds producing a discontinuous product. As with the hydride bed in vessel 22, upon desorption of the bed in vessels 24, 26 and 28, hydrogen product exists the vessels through lines 34 and 37; 38 and 41; and 42 and 45 respectively, and is collected in a collection line 52. The hydrogen product in collection line 52 is compressed to between 150 and 250 psia in compressor 54 and cooled to between 30° and 40° C. in associated heat exchanger 56, to produce a hydrogen product stream 58.

A hydrogen rinse stream 53 is taken off of the hydrogen product stream 58 as a slip-stream for use in the rinse step of the hydride cycle. The hydrogen rinse stream 53 enters the hydride-containing vessels 22, 24, 26 and 28 through lines 31 and 32; 35 and 36; 39 and 40; and 43 and 44, respectively. The hydrogen rinse stream 53 removes any nitrogen or other non-hydrogen gases which become entrapped in the void spaces of the vessel or the metal hydride bed. It is preferred that the rinse stream is a slip-stream from the hydrogen products stream although any source of pure hydrogen can be used.

The hydrogen product stream 58 has a purity of at least 99.9% and preferably as high as 99.95% and represents a recovery of at least 95% based upon the feed concentration. The present invention provides a means for producing hydrogen on-site at demand without being near a hydrogen production plant or without being tied to a liquid hydrogen system. The present invention differs from the previous ammonia dissociation processes in that 95% recovery is achieved as compared to 75% recovery when using a PSA-type system. Additionally, the present invention is superior to previously taught thermal swing hydride units in that no heating or cooling is required to adsorb or desorb the hydrogen thereby reducing both utility costs and simplifying the process equipment. Depending upon the design of the hydride purification unit, a purified nitrogen product stream can also be recovered from this process.

Having thus described the present invention what is now deemed appropriate for Letters Patent is set out in the following appended claims.

What is claimed is:

1. A process for producing hydrogen having a purity of at least 99.9% at a recovery of at least 95% from liquid anhydrous ammonia, said process comprising:
    (a) vaporizing said liquid anhydrous ammonia to produce a gaseous ammonia stream;
    (b) passing said gaseous ammonia stream to a dissociation unit to dissociate the gas stream to its constituents;
    (c) compressing said dissociated gas stream to a pressure between 150 and 250 psia;
    (d) passing said compressed dissociated gas stream to an adiabatic metal hydride purification unit to adsorb hydrogen present in said stream thereby producing a purified nitrogen stream;
    (e) recovering the hydrogen adsorbed in said hydride unit at a recovery of at least 95% based on said liquid anhydrous ammonia, the recovered hydrogen having a purity of at least 99.9%; and
    (f) using a portion of said hydrogen recovered from the metal hydride purification unit as a slip-stream for use as a hydrogen rinse in the adiabatic metal hydride purification unit.

2. The process in accordance with claim 1 wherein said dissociation unit comprises a plurality of catalyst-filled tubes in a fired heater.

3. The process in accordance with claim 1 wherein said dissociated gas stream is cooled to a temperature between 30° and 40° C. prior to being passed to the metal hydride purification unit.

4. The process in accordance with claim 1 wherein the adiabatic metal hydride purification unit comprises a plurality of metal hydride beds operating in a sequential manner.

5. The process in accordance with claim 1 wherein the recovered hydrogen has a purity of at least 99.95%.

6. The process in accordance with claim 1 wherein said hydrogen recovered from the metal hydride purification unit is subsequently compressed to between 150 and 250 psia.

* * * * *